(12) United States Patent
Kim et al.

(10) Patent No.: US 8,107,530 B2
(45) Date of Patent: Jan. 31, 2012

(54) APPARATUS AND METHOD FOR SWITCHING BETWEEN SINGLE DESCRIPTION AND MULTIPLE DESCRIPTIONS

(75) Inventors: Il-Koo Kim, Pyeongtaek-si (KR); Nam-Ik Cho, Seoul (KR)

(73) Assignees: Seoul National University Industry Foundation, Gyeonggi-do (KR); Samsung Electronics Co., Ltd., Gyeonggi-do (KR)

( * ) Notice: Subject to any disclaimer, the term of this patent is extended or adjusted under 35 U.S.C. 154(b) by 1542 days.

(21) Appl. No.: 11/518,356

(22) Filed: Sep. 11, 2006

(65) Prior Publication Data

US 2007/0058672 A1 Mar. 15, 2007

(30) Foreign Application Priority Data

Sep. 10, 2005 (KR) .......................... 10-2005-0084421

(51) Int. Cl.
 - *H04N 7/12* (2006.01)
 - *H04N 11/02* (2006.01)
 - *H04N 11/04* (2006.01)
 - *H04J 3/16* (2006.01)
 - *H04J 3/22* (2006.01)

(52) U.S. Cl. .............. 375/240.11; 375/240.01; 370/465; 370/466

(58) Field of Classification Search ............... 375/240.1, 375/240.11; 370/465, 466
See application file for complete search history.

(56) References Cited

U.S. PATENT DOCUMENTS

| | | | | |
|---|---|---|---|---|
| 7,382,729 B2 * | 6/2008 | Honda et al. | .................. | 370/235 |
| 2003/0072376 A1 * | 4/2003 | Krishnamachari et al. | ......................... | 375/240.26 |
| 2004/0057465 A1 * | 3/2004 | Chen et al. | ..................... | 370/474 |
| 2006/0098738 A1 * | 5/2006 | Cosman et al. | .......... | 375/240.16 |

FOREIGN PATENT DOCUMENTS

| | | |
|---|---|---|
| JP | 06-290551 | 10/1994 |
| KR | 100129574 B1 | 11/1997 |
| KR | 1020000032248 A | 6/2000 |

* cited by examiner

Primary Examiner — Christopher S Kelley
Assistant Examiner — Chikaodili E Anyikire
(74) Attorney, Agent, or Firm — Harness, Dickey & Pierce, P.L.C.

(57) ABSTRACT

Provided is an apparatus for and a method of transcoding video, in which, in the transmission of a compressed video, the compressed video is transcoded into multiple descriptions in an error prone environment and is transcoded into a single description in an lower error or errorless environment. Video transcoder includes a decoding unit, a single description/multiple description determining unit, and a transcoding unit. The decoding unit decodes a compressed video to generate video header, a motion vector, and a DCT (discrete cosine transform) coefficient for each frame. The single description/multiple description determining unit determines whether to perform transcoding into a single description or multiple descriptions based on the possibility of errors occurring in a transmission channel of the compressed video. The transcoding unit performs transcoding into the single description by coding the DCT coefficient together with the video header and the motion vector when the single description/multiple description determining unit determines to perform transcoding into the single description and performs transcoding into the multiple descriptions by dividing the DCT coefficient into a plurality of DCT coefficients and coding each of the DCT coefficients together with the video header and the motion vector when the single description/multiple description determining unit determines to perform transcoding into the multiple descriptions.

10 Claims, 3 Drawing Sheets

APPARATUS AND METHOD FOR SWITCHING BETWEEN SINGLE DESCRIPTION AND MULTIPLE DESCRIPTIONS

PRIORITY STATEMENT

This application claims the benefit of Korean Patent Application No. 10-2005-0084421, filed on Sep. 10, 2005, in the Korean Intellectual Property Office, the disclosure of which is incorporated herein in its entirety by reference.

BACKGROUND

1. Field

Example embodiments relate to a video coding apparatus and method, for example, to an apparatus for and a method of transcoding video, in which, in the transmission of compressed video, the compressed video is transcoded into multiple descriptions in an error-prone environment and is transcoded into a single description in a lower error or errorless environment.

2. Description of the Related Art

With the recent advances in multimedia technologies, bulk transmission of multimedia data including audio, image, and video is common.

In the case of small-sized user terminals, for example, cellular phones or personal digital assistants (PDAs), large quantities multimedia data should be transcoded according to a transmission environment and/or the capability of the user terminal. For example, higher-definition compressed video data (e.g., compressed video) may be transmitted after the bit rate, frame size, frame rate, and/or video format are transcoded.

For example, when a compressed video is transmitted wirelessly, video transcoding should be performed in an error-adaptive manner. In other words, it may be important to transcode the compressed video in an error adaptive-manner according to a transmission channel environment.

Video compression methods, for example, moving picture experts group (MPEG) and H.26x improve compression efficiency using relationships between adjacent information. However, in these video compression methods, when an error occurs in a portion of a compressed video, the error propagates to the surrounding areas, resulting in degradation of video quality.

To address this problem, a method of transcoding a compressed video in an error-adaptive manner according to a channel environment has been used, for example, a method of spatially localizing an error (e.g., a spatial localization method) or a method of temporally localizing an error (e.g., a temporal localization method).

A spatial localization method may prevent the spatial propagation of an error by frequently adding a sync marker, for example, a slice header and/or a group of blocks (GOB) header.

When an error occurs in a slice or a GOB, the error may propagate spatially until it meets a new sync marker. Thus, the spatial localization method limits error propagation to a smaller area by reducing an interval between sync markers.

Figure 1:
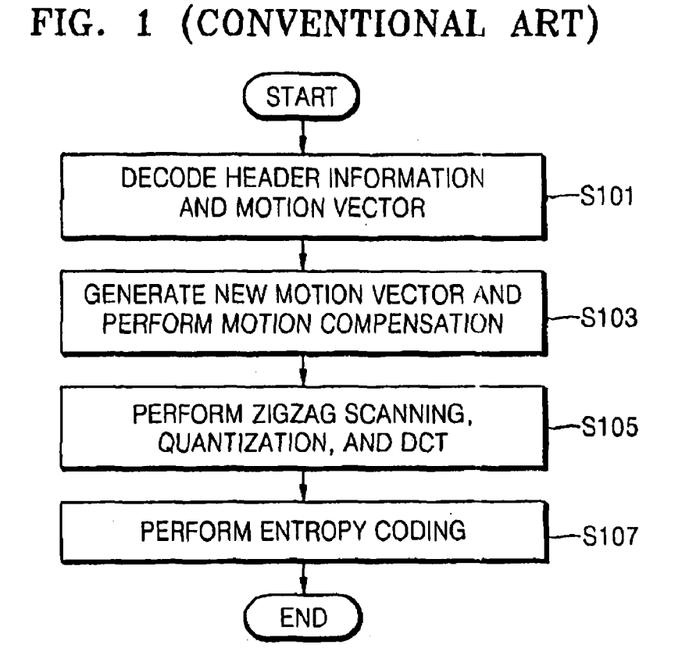
FIG. 1 is a flowchart illustrating a conventional spatial localization method.

FIG. 1 is a flowchart illustrating a conventional spatial localization method.

Header information and a motion vector may be decoded from compressed video in operation S101. A new motion vector may be generated for spatial localization and motion compensation may be performed using the new motion vector in operation S103.

A process following the motion compensation is the same as that of a general video compression method. In other words, after data of a motion-compensated block is zigzag-scanned, it may be quantized and discrete cosine transformed (DCTed) in operation S105. The DCTed data may be compressed through entropy-coding in operation S107, thereby completing data transcoding.

A temporal localization method may limit the temporal propagation of an error by changing an inter macroblock using temporal redundancies into an independent intra macroblock.

Motion compensation is typically not used for an intra macroblock. Thus, to avoid error propagation, a temporal localization method may prevent an inter macroblock from referring to a reference frame having an error by changing the inter macroblock to an intra macroblock.

Figure 2:
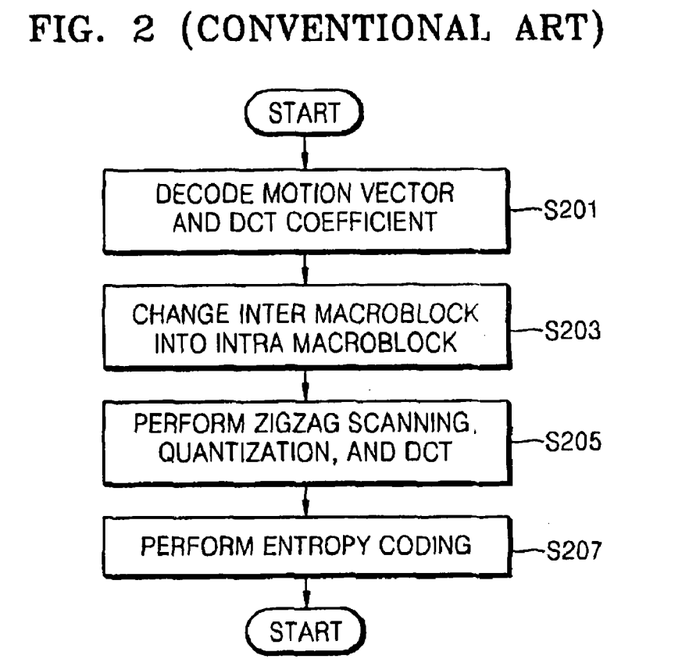
FIG. 2 is a flowchart illustrating a conventional temporal localization method.

FIG. 2 is a flowchart illustrating a conventional temporal localization method.

A motion vector and a DCT coefficient may be decoded from a compressed video in operation S201. An inter macroblock may be changed into an intra macroblock using the motion vector in operation S203.

Data of the intra macroblock may be zigzag-scanned, quantized and/or DCTed in operation S205. The DCTed data may be compressed through entropy-coding in operation S207, thereby completing data transcoding.

However, the conventional spatial localization method and/or temporal localization method may not effectively reduce or prevent error propagation in an error prone channel environment, resulting in quality degradation of transmitted data (e.g., video).

SUMMARY

Example embodiments provide an apparatus for transcoding video, in which, in the transmission of a compressed video, the compressed video may be transcoded into multiple descriptions in an error prone environment and may be transcoded into a single description in a lower error or errorless environment.

Example embodiments also provide a method of transcoding video, in which, in the transmission of compressed video, the compressed video may be transcoded into multiple descriptions in an error prone environment and may be transcoded into a single description in a lower error or errorless environment.

According to example embodiments, there is provided a video transcoder including a decoding unit, a single description/multiple description determining unit, and/or a transcoding unit. The decoding unit may decode compressed video to generate a video header, a motion vector, and a DCT (discrete cosine transform) coefficient for each frame of the compressed video. The single description/multiple description determining unit may determine whether to perform transcoding into a single description or multiple descriptions, based on the possibility of errors occurring in a transmission channel of the compressed video. The transcoding unit may perform transcoding into the single description by coding the DCT coefficient together with the video header and the motion vector when the single description/multiple description determining unit determines transcoding into the single description should be performed and performs transcoding into the multiple descriptions by dividing the DCT coefficient into a plurality of DCT coefficients and coding each of the DCT coefficients together with the video header and the motion vector when the single description/multiple description determining unit determines transcoding into the multiple descriptions should be performed.

The transcoding unit may include a single description transcoding unit and a multiple description transcoding unit. The single description transcoding unit may perform transcoding into the single description and the multiple description transcoding unit performs transcoding into the multiple descriptions. The multiple description transcoding unit may include a start position determining unit, a DCT coefficient dividing unit, and/or a compression coding unit. The start position determining unit may determine a start position of division of the DCT coefficient in a predetermined or desired scanning order according to a frequency characteristic of the DCT coefficient. The DCT coefficient dividing unit may cause all data of the DCT coefficient preceding the start position to be included in each of the plurality of divided DCT coefficients and may cause data of the DCT coefficient following the start position to be alternatively included in each of the plurality of divided DCT coefficients, thereby generating the plurality of divided DCT coefficients. The compression coding unit may code each of the plurality of divided DCT coefficients together with the video header and the motion vector.

According to example embodiments, there is provided video transcoder including a decoding unit, a single description/multiple description determining unit, and/or a transcoding unit. The decoding unit may decode compressed video to generate video header, a motion vector, and a DCT (discrete cosine transform) coefficient for each frame of the compressed video. The single description/multiple description determining unit may determine whether to perform transcoding into a single description or multiple descriptions by comparing a Lagrange cost of the single description and a Lagrange cost of the multiple descriptions determined according to a sum of reconstruction errors in each pixel of each frame of the compressed video in a transmission channel. The transcoding unit may perform transcoding into the single description by coding the DCT coefficient together with the video header and the motion vector when the single description/multiple description determining unit determines transcoding into the single description should be performed and performs transcoding into the multiple descriptions by dividing the DCT coefficient into a plurality of DCT coefficients and coding each of the DCT coefficients together with the video header and the motion vector when the single description/multiple description determining unit determines transcoding into the multiple descriptions should be performed.

The Lagrange cost of the single description may be the sum of reconstruction errors, the Lagrange cost of the multiple descriptions may be a sum of the reconstruction errors and a multiplication result of the amount of redundancy and a predetermined or desired Lagrange multiplier, and the single description/multiple description determining unit may determine transcoding into the multiple descriptions should be performed if the Lagrange cost of the single description is larger than that of the multiple descriptions and may determine transcoding into the single description should be performed if the Lagrange cost of the multiple descriptions is larger than that of the single description.

The transcoding unit may include a single description transcoding unit and a multiple description transcoding unit. The single description transcoding unit may perform transcoding into the single description and the multiple description transcoding unit may perform transcoding into the multiple descriptions. The multiple description transcoding unit may include a start position determining unit, a DCT coefficient dividing unit, and/or a compression coding unit. The start position determining unit may determine a start position of division of the DCT coefficient in a predetermined or desired scanning order according to a frequency characteristic of the DCT coefficient. The DCT coefficient dividing unit may cause all data of the DCT coefficient preceding the start position to be included in each of the plurality of divided DCT coefficients and may cause data of the DCT coefficient following the start position to be alternatively included in each of the plurality of divided DCT coefficients, thereby generating the plurality of divided DCT coefficients. The compression coding unit may code each of the plurality of divided DCT coefficients together with the video header and the motion vector.

According to example embodiments, there is provided video transcoding method. The video transcoding method may include decoding a compressed video to generate video header, a motion vector, and a DCT (discrete cosine transform) coefficient for each frame of the compressed video, determining whether to perform transcoding into a single description or multiple descriptions based on the possibility of errors occurring in a transmission channel for the compressed video, and/or performing transcoding into the single description by coding the DCT coefficient together with the video header and the motion vector when a determination is made to perform transcoding into the single description and performing transcoding into the multiple descriptions by dividing the DCT coefficient into a plurality of DCT coefficients and coding each of the DCT coefficients together with the video header and the motion vector when a determination is made to perform transcoding into the multiple descriptions.

According to example embodiments, there is provided video transcoding method. The video transcoding method may include decoding a compressed video to generate video header, a motion vector, and a DCT (discrete cosine transform) coefficient for each frame of the compressed video, determining whether to perform transcoding into a single description or multiple descriptions by comparing a Lagrange cost of the single description and a Lagrange cost of the multiple descriptions determined according to a sum of reconstruction errors in each pixel of each frame of the compressed video in a transmission channel, and/or performing transcoding into the single description by coding the DCT coefficient together with the video header and the motion vector when the single description/multiple description determining unit determines transcoding into the single description should be performed and may perform transcoding into the multiple descriptions by dividing the DCT coefficient into a plurality of DCT coefficients and coding each of the DCT coefficients together with the video header and the motion vector when the single description/multiple description determining unit determines transcoding into the multiple descriptions should be performed.

BRIEF DESCRIPTION OF THE DRAWINGS

Example embodiments will become more apparent by description in detail with reference to the attached drawings in which.

DETAILED DESCRIPTION OF EXAMPLE EMBODIMENTS

Hereinafter, example embodiments will be described in detail with reference to the accompanying drawings. In the drawings, the same or similar elements are denoted by the same reference numerals.

Example embodiments are described more fully hereinafter with reference to the accompanying drawings. Example embodiments may, however, be embodied in many different forms and should not be construed as limited to the embodiments set forth herein. Rather, example embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it may be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" may encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-section illustrations that are schematic illustrations. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the appended claims.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 3:
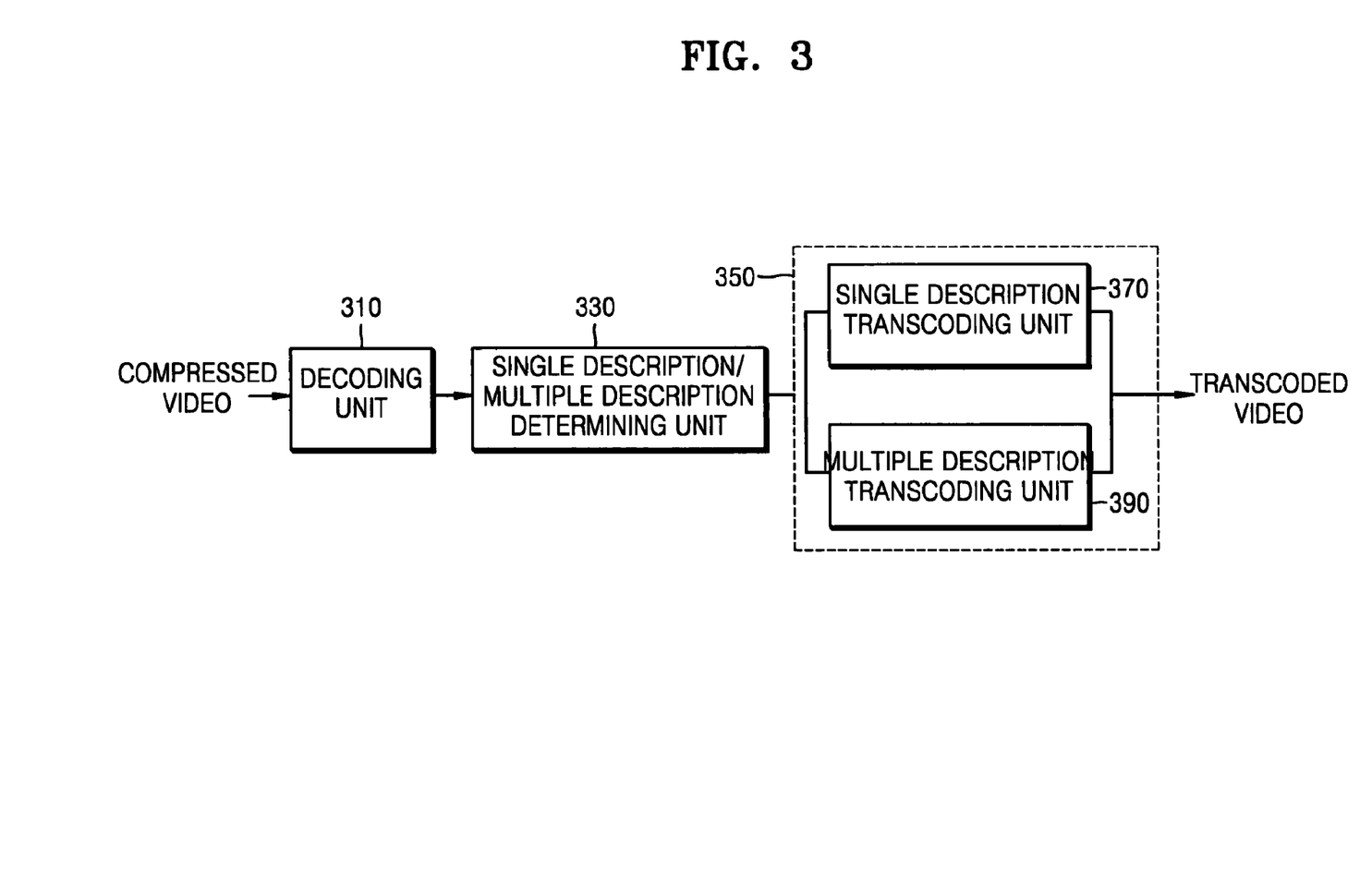
FIG. 3 is a block diagram of video transcoder according to an example embodiment.

FIG. 3 is a block diagram of video transcoder 300 according to an example embodiment.

A video transcoder 300 may include a decoding unit 310, a single description/multiple description determining unit 330, and/or a transcoding unit 350. The decoding unit 310 may decode compressed video and generates a video header, a motion vector, and a discrete cosine transform (DCT) coefficient for each frame.

The single description/multiple description determining unit 330 may determine whether to perform transcoding into single description or multiple descriptions, based on the possibility of errors occurring.

In an example embodiment, transcoding into a single description may be defined as transcoding a video header, a motion vector, and a DCT coefficient decoded from a compressed video using a predetermined or desired coding method, without a change thereto.

In an example embodiment, transcoding into multiple descriptions may be defined as dividing a DCT coefficient, among a video header, a motion vector, and the DCT coefficient decoded for each frame by the decoding unit 310, into a plurality of DCT coefficients and transcoding each of the divided DCT coefficients, the video header, and the motion vector according to a predetermined or desired coding method.

For example, when a DCT coefficient may be divided into three DCT coefficients A, B, and C, transcoding of the DCT coefficient into multiple descriptions means transcoding the DCT coefficient into three descriptions, e.g., a first description into which the DCT coefficient A, video header, and a motion vector are coded, a second description into which the DCT coefficient B, the video header, and the motion vector are coded, and a third description into which the DCT coefficient C, the video header, and the motion vector are coded.

Thus, the single description/multiple description determining unit 330 may determine whether to transcode compressed video into multiple descriptions in a channel having a higher possibility of errors occurring, thereby enabling error-adaptive transmission. The single description/multiple description determining unit 330 may also determine to transcode a compressed video into a single description in a channel having a lower possibility of errors occurring, thereby improving compression efficiency.

The transcoding unit 350 may include a single description transcoding unit 370 and a multiple description transcoding unit 390.

When the single description/multiple description determining unit 330 determines to transcode into a single description, the single description transcoding unit 370 may code a video header, a motion vector, and a DCT coefficient decoded from a compressed video using a predetermined or desired coding method, without a change thereto. The predetermined or desired coding method may be a coding method used to generate the compressed video.

When the single description/multiple description determining unit 330 determines to transcode into multiple descriptions, the single description transcoding unit 370 may divide the DCT coefficient into a plurality of DCT coefficients and code each of the divided DCT coefficients together with the video header and the motion vector. Hereinafter, the configuration and operation of the multiple description transcoding unit 390 will be described with reference to FIG. 4.

Figure 4:
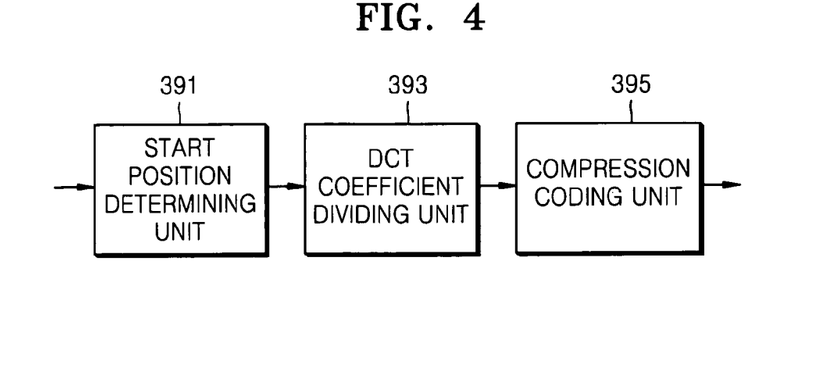
FIG. 4 is an example block diagram of a multiple description transcoding unit of FIG. 3.

FIG. 4 is an example block diagram of the multiple description transcoding unit 390 of FIG. 3.

The multiple description transcoding unit 390 may include a start position determining unit 391, a DCT coefficient dividing unit 393, and/or a compression coding unit 395. The start position determining unit 391 may determine the start position of division of the DCT coefficient based on a predetermined or desired scanning order according to the frequency characteristic of the DCT coefficient.

For example, when zigzag scanning is performed, in a zigzag-scanned macroblock, DCT coefficient data at predetermined or desired positions according to a scanning order may have a lower frequency characteristic. In general, in DCT, DCT coefficient data of a lower-frequency area is more important than DCT coefficient data of a higher-frequency area.

Thus, in an example embodiment, the start position determining unit 391 determines the position of DCT coefficient data having a lower-frequency characteristic as a start position based on a predetermined or desired scanning order.

In an example embodiment, the start position may be given by:

$$\text{Start position} = a \log_{10}(PLR) + b \qquad (1),$$

where a is the number of pixels included in a macroblock for which a DCT coefficient is calculated, b=2a, 0<Start position<(a−1), and PLR is a packet loss rate in a transmission channel of a compressed video.

In general, as a packet loss rate increases, a start position increases, resulting in more redundant DCT coefficient data. According to an example embodiment, a video transcoder 300 using the packet loss rate may be advantageous due to its lower complexity when compared to a case where a bit rate-distortion (RD) optimization method is used.

In an example embodiment, the size of a block may be 8×8, a=64, b=128, and the start position may range between 0 and 63. For example, when $1^{st}$ through $15^{th}$ DCT coefficient data according to a predetermined or desired scanning order have a lower-frequency characteristic, the start position may be 15.

The DCT coefficient dividing unit 393 may cause all data of a DCT coefficient preceding the start position to be included in each of a plurality of DCT coefficients and data of the DCT coefficient following the start position to be alternatively included in each of the plurality of DCT coefficients, thereby generating the plurality of divided DCT coefficients.

For example, when the start position is 15 and a DCT coefficient is to be divided into three DCT coefficients A, B, and C, the $1^{st}$ through $15^{th}$ portions of data according to a predetermined or desired scanning order are all included in each of the DCT coefficients A, B, and C. The $16^{th}$ portion of data and following data are alternatively included in each of the DCT coefficients A, B, and C. In other words, the $16^{th}$ portion of data is included in the DCT coefficient A, the $17^{th}$ portion of data is included in the DCT coefficient B, the $18^{th}$ portion of data is included in the DCT coefficient C, and the $19^{th}$ portion of data is included in the DCT coefficient A.

In such a manner, the DCT coefficient dividing unit 393 may divide a DCT coefficient into a plurality of DCT coefficients according to start position.

The compression coding unit 395 may code each of the plurality of divided DCT coefficients, video header, and a motion vector together.

For example, when the DCT coefficient is divided into three DCT coefficients A, B, and C, the compression coding unit 395 may code each of the DCT coefficients A, B, and C. In other words, the compression coding unit 395 may code the DCT coefficient A, video header, and a motion vector together, code the DCT coefficient B, the video header, and the motion vector together, and the DCT coefficient C, the video header, and the motion vector together.

As mentioned above, when the DCT coefficient is divided into three DCT coefficients A, B, and C, the compression coding unit 395 may transcode compressed video into three multiple descriptions.

Video transcoders according to example embodiments may determine whether to perform transcoding into a single description or multiple descriptions using a Lagrange multiplier method.

In other words, a single description/multiple description determining unit of the video transcoder according to example embodiments may calculate a reconstruction error in each pixel of a frame for a transmission channel of a compressed video, calculate and compare a Lagrange cost of a single description and a Lagrange cost of multiple descriptions in response to a sum of reconstruction errors in pixels of the frame, and determine whether to perform transcoding into a single description or multiple descriptions, based on the comparison result.

The configuration and operation of a video transcoder according to example embodiments may be the same as those of the video transcoder 300 of FIG. 3, except for the operation of the single description/multiple description determining unit. Thus, a process of determining whether to use transcoding into a single description or multiple descriptions in the video transcoder according to example embodiments will be described with reference to FIG. 5.

Figure 5:
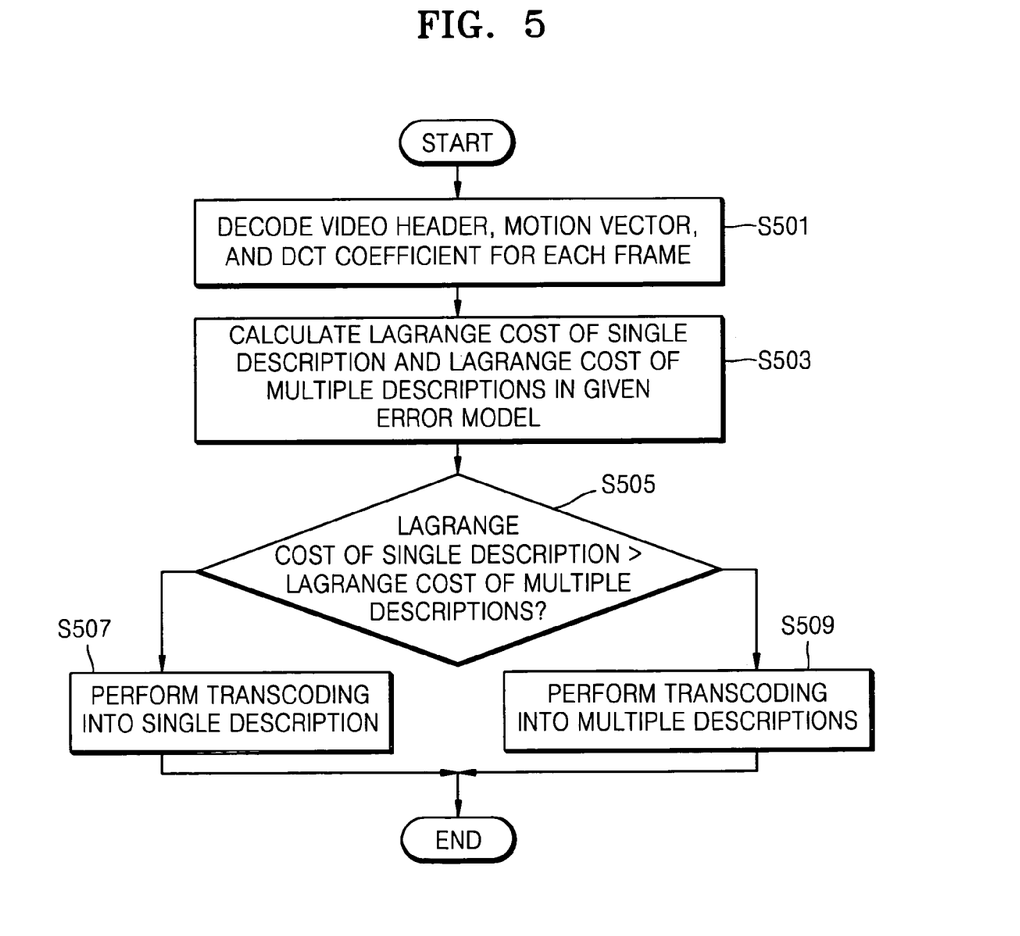
FIG. 5 is a flowchart illustrating a process of determining whether to perform transcoding into single description or multiple descriptions in video transcoder according to an example embodiment.

FIG. 5 is a flowchart illustrating the process of determining whether to perform transcoding into a single description or multiple descriptions in the video transcoder according to example embodiments. The process may be performed by a single description/multiple description determining unit.

After a decoding unit decodes a video header, a motion vector, and a DCT coefficient for each frame in operation S501, the single description/multiple description determining unit may calculate a Lagrange cost in an error model given for a transmission channel of a compressed video in operation S503.

In general, if a channel is determined, an error model in the channel is also determined. In an example embodiment, a Lagrange cost may be calculated for both a single description and multiple descriptions. In addition, to determine whether to use transcoding into a single description or multiple descriptions, a Lagrange cost of a single description and a Lagrange cost of multiple descriptions may be compared and a determination may be made to transcode into the description having the smaller Lagrange cost.

The Lagrange cost may be calculated as follows:

$$J = D_{total} + \lambda \times \rho \quad (2),$$

where J is the Lagrange cost, $D_{total}$ is a sum of reconstruction errors, $\lambda$ is a Lagrange multiplier, and $\rho$ is the amount of redundancy. $\rho$ is equal to 0 when the Lagrange cost of a single description is calculated, and $\rho$ is obtained by subtracting the amount of bits required for compressing a single description from the amount of bits required for compressing all descriptions when the Lagrange cost of multiple descriptions is calculated.

As may be seen from Equation 2, when the Lagrange multiplier method is used, the Lagrange cost of a single description is a sum of reconstruction errors for pixels and the Lagrange cost of multiple descriptions is a sum of the reconstruction errors and a multiplication result of the amount of redundancy and a predetermined or desired Lagrange multiplier.

After the Lagrange cost of a single description and the Lagrange cost of multiple descriptions are calculated, the single description/multiple description determining unit may compare the calculated Lagrange costs. If the Lagrange cost of multiple descriptions is smaller than that of a single description, the single description/multiple description determining unit determines to perform transcoding into the multiple descriptions. If the Lagrange cost of a single description is smaller than that of multiple descriptions, the single description/multiple description determining unit determines to perform transcoding into the single description.

In an example embodiment, the amount of redundancy may be obtained by calculating an actual bit rate using entropy coding and a reconstruction error may be obtained using an error model based on a possibility of errors occurring in a transmission channel of a compressed video and an error concealment method performed by a decoder when an error occurs.

A reconstruction error for each pixel of a frame for a channel may be calculated using an error model as follows:

$$d_n^i = E\{(f_n^i - \tilde{f}_n^i)^2\} = (f_n^i)^2 - 2f_n^i E\{\tilde{f}_n^i\} + E\{(\tilde{f}_n^i)^2\} \quad (3),$$

where $d_n^i$ is a reconstruction error of an $i^{th}$ pixel in an $n^{th}$ frame, $f_n^i$ may be obtained using video header, a motion vector, and a DCT coefficient decoded into original values of the $i^{th}$ pixel in the $n^{th}$ frame, $\tilde{f}_n^i$ is a reconstruction predicted value of the $i^{th}$ pixel in the $n^{th}$ frame, and E is an averaging operation in which $E\{\tilde{f}_n^i\}$ is a first-order averaging operation and $E\{(\tilde{f}_n^i)^2\}$ is a second-order averaging operation.

The first-order averaging operation and the second-order averaging operation may be used according to whether a compressed video is to be compressed in an inter format or an intra format and is to be transcoded into a single description or multiple descriptions.

When a compressed video is transcoded into a single description in the intra format, the first-order averaging operation and the second-order averaging operation may be calculated as follows:

$$E\{\tilde{f}_n^i\}(I) = (1-p)(\hat{f}_n^i) + p(1-p)E\{\tilde{f}_{n-1}^k\} + p^2 E\{\tilde{f}_{n-1}^i\}$$

$$E\{(\tilde{f}_n^i)^2\}(I) = (1-p)(\hat{f}_n^i)^2 + p(1-p)E\{(\tilde{f}_{n-1}^k)^2\} + p^2 E\{(\tilde{f}_{n-1}^i)^2\} \quad (4)$$

When a compressed video is transcoded into multiple descriptions in the intra format, the first-order averaging operation and the second-order averaging operation may be calculated as follows:

$$E\{\tilde{f}_n^i\}(I) = (1-p)^2(\hat{f}_n^i) + p(1-p)((\tilde{f}_n^i)_1 + (\tilde{f}_n^i)_2) + p^2 E\{\tilde{f}_{n-1}^i\}$$

$$E\{(\tilde{f}_n^i)^2\}(I) = (1-p)^2(\hat{f}_n^i)^2 + p(1-p)((\hat{f}_n^i)_1^2 + (\hat{f}_n^i)_2^2) + p^2 E\{(\tilde{f}_{n-1}^i)^2\} \quad (5)$$

When a compressed video is transcoded into a single description in the inter format, the first-order averaging operation and the second-order averaging operation may be calculated as follows:

$$E\{\tilde{f}_n^i\}(P) = (1-p)(\hat{e}_n^i + E\{\tilde{f}_{n-1}^j\}) + p(1-p)E\{\tilde{f}_{n-1}^k\} + p^2 E\{\tilde{f}_{n-1}^i\}$$

$$E\{(\tilde{f}_n^i)^2\}(P) = (1-p)E(\hat{e}_n^i + \tilde{f}_{n-1}^j)^2 + p(1-p)E\{(\tilde{f}_{n-1}^k)^2\} + p^2 E\{(\tilde{f}_{n-1}^i)^2\} \quad (6)$$

When a compressed video is transcoded into multiple descriptions in the inter format, the first-order averaging operation and the second-order averaging operation may be calculated as follows:

$$E\{\tilde{f}_n^i\}(P) = (1-p)^2(\hat{e}_n^i + E\{\tilde{f}_{n-1}^j\}) + \quad (7)$$
$$p(1-p)\left((\hat{e}_n^i)_1 + E\{\tilde{f}_{n-1}^{j1}\} + (\hat{e}_n^i)_2 + E\{\tilde{f}_{n-1}^{j2}\}\right) + p^2 E\{\tilde{f}_{n-1}^i\}$$

$$E\left\{(\tilde{f}_n^i)^2\right\}(P) = (1-p)^2\left((\hat{e}_n^i)^2 + 2\hat{e}_n^i E\{\tilde{f}_{n-1}^j\} + E\{\tilde{f}_{n-1}^j\}^2\right) +$$
$$p(1-p)\left((\hat{e}_n^i)_1^2 + 2(\hat{e}_n^i)_1 E\{\tilde{f}_{n-1}^{j1}\} + E\left\{(\tilde{f}_{n-1}^{j1})^2\right\} + (\hat{e}_n^i)_2^2 +$$
$$2(\hat{e}_n^i)_2 E\{\tilde{f}_{n-1}^{j2}\} + E\{(\tilde{f}_{n-1}^{j2})^2\}\right) + p^2 E\left\{(\tilde{f}_{n-1}^i)^2\right\}$$

In single description compression, $\hat{f}_n^i$ is a reconstructed value when an error does not occur, $\tilde{f}_{n-1}^k$ is a reconstructed value using motion compensation error concealment, $\tilde{f}_{n-1}^i$ is a pixel value of a previous frame, which is in the same position as a pixel value of a current frame, $\hat{e}_n^i$ is a motion-compensated value in the inter format.

In multiple description compression, $(\tilde{f}_n^i)_1$ and $(\tilde{f}_n^i)_2$ is pixel values of a first description and a second description, $\tilde{f}_{n-1}^i$ is a pixel value of a previous frame, which is in the same position as a pixel value of a current frame, $\hat{e}_n^i$ is a motion compensated value in the inter format, $(\hat{e}_n^i)$ and $(\hat{e}_n^i)_2$ are motion-compensated values using the first description and the second description, and $\tilde{f}_{n-1}^{j2}$ and $\tilde{f}_{n-1}^{j1}$ indicate values of motion-compensated first and second descriptions.

As described above, according to example embodiments, transcoding into multiple descriptions may be performed in an error prone channel environment, thereby enabling error-adaptive transmission. Transcoding into a single description may be performed in a lower error or errorless channel environment, thereby improving compression efficiency.

Also, faster transcoding may be possible because an algorithm having higher complexity, for example, motion estimation, is not used.

While example embodiments have been particularly shown and described, it will be understood by those of ordinary skill in the art that various changes in form and details may be made therein without departing from the spirit and scope of example embodiments as defined by the following claims.

What is claimed is:
1. A video transcoder comprising:
   a decoding unit decoding compressed video to generate a video header, a motion vector, and a DCT (discrete cosine transform) coefficient for each frame of the compressed video;

a single description/multiple description determining unit determining whether to perform transcoding into a single description or multiple descriptions based on the possibility of errors occurring in a transmission channel of the compressed video; and a transcoding unit performing transcoding into the single description by coding the DCT coefficient together with the video header and the motion vector when the single description/multiple description determining unit determines to perform transcoding into the single description and performing transcoding into the multiple descriptions by dividing the DCT coefficient into a plurality of DCT coefficients and coding each of the DCT coefficients together with the video header and the motion vector when the single description/multiple description determining unit determines to perform transcoding into the multiple descriptions;

wherein the transcoding unit comprises:

a single description transcoding unit performing transcoding into the single description; and a multiple description transcoding unit performing transcoding into the multiple descriptions, wherein the multiple description transcoding unit includes:

a start position determining unit determining a start position of division of the DCT coefficient in a predetermined or desired scanning order according to a frequency characteristic of the DCT coefficient;

a DCT coefficient dividing unit causing all data of the DCT coefficient preceding the start position to be included in each of the plurality of divided DCT coefficients and causing data of the DCT coefficient following the start position to be alternatively included in each of the plurality of divided DCT coefficients, thereby generating the plurality of divided DCT coefficients; and a compression coding unit coding each of the plurality of divided DCT coefficients together with the video header and the motion vector, and wherein the start position determining unit determines the start position as follows:

$$\text{Start position} = a\log_{10}(PLR) + b$$

where a is the number of pixels included in a macroblock for which the DCT coefficient is calculated, b=2a, 0<Start position<(a−1), and PLR is a packet loss rate in the transmission channel.

2. A video transcoder comprising:

a decoding unit decoding compressed video to generate a video header, a motion vector, and a DCT (discrete cosine transform) coefficient for each frame of the compressed video;

a single description/multiple description determining unit determining whether to perform transcoding into a single description or multiple descriptions based on the possibility of errors occurring in a transmission channel of the compressed video; and a transcoding unit performing transcoding into the single description by coding the DCT coefficient together with the video header and the motion vector when the single description/multiple description determining unit determines to perform transcoding into the single description and performing transcoding into the multiple descriptions by dividing the DCT coefficient into a plurality of DCT coefficients and coding each of the DCT coefficients together with the video header and the motion vector when the single description/multiple description determining unit determines to perform transcoding into the multiple descriptions, wherein the single description/multiple description determining unit determines whether to perform transcoding into the single description or the multiple descriptions by comparing a Lagrange cost of the single description and a Lagrange cost of the multiple descriptions determined according to a sum of reconstruction errors in each pixel of each frame of the compressed video in a transmission channel;

wherein the transcoding unit comprises:

a single description transcoding unit performing transcoding into the single description; and a multiple description transcoding unit performing transcoding into the multiple descriptions, wherein the multiple description transcoding unit includes:

a start position determining unit determining a start position of division of the DCT coefficient in a predetermined or desired scanning order according to a frequency characteristic of the DCT coefficient;

a DCT coefficient dividing unit causing all data of the DCT coefficient preceding the start position to be included in each of the plurality of divided DCT coefficients and causing data of the DCT coefficient following the start position to be alternatively included in each of the plurality of divided DCT coefficients, thereby generating the plurality of divided DCT coefficients; and a compression coding unit coding each of the plurality of divided DCT coefficients together with the video header and the motion vector, and wherein the start position is determined as follows:

$$\text{Start position} = a\log_{10}(PLR) + b,$$

where a is the number of pixels included in a macroblock for which the DCT coefficient is calculated, b=2a, 0<Start position<(a−1), and PLR is a packet loss rate in the transmission channel.

3. The video transcoder of claim 2, wherein the Lagrange cost of the single description is the sum of reconstruction errors, the Lagrange cost of the multiple descriptions is a sum of the reconstruction errors and a multiplication result of the amount of redundancy and a predetermined or desired Lagrange multiplier, and the single description/multiple description determining unit determines to perform transcoding into the multiple descriptions if the Lagrange cost of the single description is larger than that of the multiple descriptions and determines to perform transcoding into the single description if the Lagrange cost of the multiple descriptions is larger than that of the single description.

4. The video transcoder of claim 3, wherein the Lagrange cost is calculated as follows:

$$J = D_{total} + \lambda \times \rho,$$

where J is the Lagrange cost, $D_{total}$ is a sum of reconstruction errors, $\lambda$ is a Lagrange multiplier, and $\rho$ is the amount of redundancy where $\rho$ is equal to 0 when the Lagrange cost of the single description is calculated and $\rho$ is obtained by subtracting the number of bits required for compressing the single description from the number of bits required for compressing all descriptions when the Lagrange cost of the multiple descriptions is calculated.

5. The video transcoder of claim 2, wherein a reconstruction error in each pixel of each frame of the compressed video in the transmission channel is calculated as follows:

$$d_n^i = E\{(f_n^i - \tilde{f}_n^i)^2\} = (f_n^i)^2 - 2f_n^i E\{\tilde{f}_n^i\} + E\{(\tilde{f}_n^i)^2\},$$

where $d_n^i$ is a reconstruction error of $i^{th}$ pixel in an $n^{th}$ frame, $f_n^i$ is an obtained using video header, a motion vector, and a DCT coefficient decoded into original values of the $i^{th}$ pixel in the $n^{th}$ frame, $\tilde{f}_n^i$ is a reconstruction predicted value of the $i^{th}$ pixel in the $n^{th}$ frame, and E is an averaging operation in which $E\{\tilde{f}_n^i\}$ is a first-order averaging operation and $E\{(\tilde{f}_n^i)^2\}$ indicates a second-order averaging operation, and wherein when the compressed video is transcoded into the single description in an intra format, the first-order averaging operation and the second-order averaging operation are calculated as follows:

$$E\{\tilde{f}_n^i\}(I) = (1-p)(\hat{f}_n^i) + p(1-p)E\{\tilde{f}_{n-1}^k\} + p^2 E\{\tilde{f}_{n-1}^i\}$$

$$E\{(\tilde{f}_n^i)^2\}(I) = (1-p)(\hat{f}_n^i)^2 + p(1-p)E\{(\tilde{f}_{n-1}^k)^2\} + p^2 E\{(\tilde{f}_{n-1}^i)^2\},$$

when the compressed video is transcoded into the multiple descriptions in an intra format, the first-order averaging operation and the second-order averaging operation are calculated as follows:

$$E\{\tilde{f}_n^i\}(I) = (1-p)^2(\hat{f}_n^i) + p(1-p)((\tilde{f}_n^i)_1 + (\tilde{f}_n^i)_2) + p^2 E\{\tilde{f}_{n-1}^i\}$$

$$E\{(\tilde{f}_n^i)^2\}(I) = (1-p)^2(\hat{f}_n^i)^2 + p(1-p)((\hat{f}_n^i)_1^2 + (\hat{f}_n^i)_2^2) + p^2 E\{(\tilde{f}_{n-1}^i)^2\},$$

when the compressed video is transcoded into the single description in the inter format, the first-order averaging operation and the second-order averaging operation are calculated as follows:

$$E\{\tilde{f}_n^i\}(P) = (1-p)(\hat{e}_n^i + E\{\tilde{f}_{n-1}^j\}) + p(1-p)E\{\tilde{f}_{n-1}^k\} + p^2 E\{\tilde{f}_{n-1}^i\}$$

$$E\{(\tilde{f}_n^i)^2\}(P) = (1-p)E(\hat{e}_n^i + \tilde{f}_{n-1}^j)^2 + p(1-p)E\{(\tilde{f}_{n-1}^k)^2\} + p^2 E\{(\tilde{f}_{n-1}^i)^2\},$$ and when the compressed video is transcoded into the multiple descriptions in the inter format, the first-order averaging operation and the second-order averaging operation are calculated as follows:

$$E\{\tilde{f}_n^i\}(P) = (1-p)^2(\hat{e}_n^i + E\{\tilde{f}_{n-1}^j\}) +$$
$$p(1-p)((\hat{e}_n^i)_1 + E\{\tilde{f}_{n-1}^{j1}\} + (\hat{e}_n^i)_2 + E\{\tilde{f}_{n-1}^{j2}\}) + p^2 E\{\tilde{f}_{n-1}^i\}$$

$$E\{(\tilde{f}_n^i)^2\}(P) = (1-p)^2((\hat{e}_n^i)^2 + 2\hat{e}_n^i E\{\tilde{f}_{n-1}^j\} + E\{\tilde{f}_{n-1}^j\}^2) +$$
$$p(1-p)\left((\hat{e}_n^i)_1^2 + 2(\hat{e}_n^i)_1 E\{\tilde{f}_{n-1}^{j1}\} + E\{(\tilde{f}_{n-1}^{j1})^2\} + (\hat{e}_n^i)_2^2 +$$
$$2(\hat{e}_n^i)_2 E\{\tilde{f}_{n-1}^{j2}\} + E\{(\tilde{f}_{n-1}^{j2})^2\}\right) + p^2 E\{(\tilde{f}_{n-1}^i)^2\}.$$

6. A video transcoding method comprising:
decoding a compressed video to generate video header, a motion vector, and a DCT (discrete cosine transform) coefficient for each frame of the compressed video;
determining whether to perform transcoding into a single description or multiple descriptions based on the possibility of errors occurring in a transmission channel for the compressed video; and
performing transcoding into the single description by coding the DCT coefficient together with the video header and the motion vector when a determination is made to perform transcoding into the single description and performing transcoding into the multiple descriptions by dividing the DCT coefficient into a plurality of DCT coefficients and coding each of the DCT coefficients together with the video header and the motion vector when a determination is made to perform transcoding into the multiple descriptions;
wherein performing transcoding into the multiple descriptions comprises:
determining a start position of division of the DCT coefficient in a predetermined or desired scanning order according to a frequency characteristic of the DCT coefficient;
causing all data of the DCT coefficient preceding the start position to be included in each of the plurality of divided DCT coefficients and causing data of the DCT coefficient following the start position to be alternatively included in each of the plurality of divided DCT coefficients, thereby generating the plurality of divided DCT coefficients; and
coding each of the plurality of divided DCT coefficients together with the video header and the motion vector, and
wherein the start position is determined as follows:

Start position=$a \log_{10}(PLR) + b$, where a is the number of pixels included in a macroblock for which the DCT coefficient is calculated, b=2a, 0<Start position<(a−1), and PLR is a packet loss rate in the transmission channel.

7. A video transcoding method comprising:
decoding a compressed video to generate video header, a motion vector, and a DCT (discrete cosine transform) coefficient for each frame of the compressed video;
determining whether to perform transcoding into a single description or multiple descriptions based on the possibility of errors occurring in a transmission channel for the compressed video; and
performing transcoding into the single description by coding the DCT coefficient together with the video header and the motion vector when a determination is made to perform transcoding into the single description and performing transcoding into the multiple descriptions by dividing the DCT coefficient into a plurality of DCT coefficients and coding each of the DCT coefficients together with the video header and the motion vector when a determination is made to perform transcoding into the multiple descriptions, and
wherein determining whether to perform transcoding into the single description or the multiple descriptions includes,
comparing a Lagrange cost of the single description and a Lagrange cost of the multiple descriptions determined according to a sum of reconstruction errors in each pixel of each frame of the compressed video in a transmission channel; and
wherein the performing of transcoding into the multiple descriptions comprises:
determining a start position of division of the DCT coefficient in a predetermined or desired scanning order according to a frequency characteristic of the DCT coefficient;
causing all data of the DCT coefficient preceding the start position to be included in each of the plurality of divided DCT coefficients and causing data of the DCT coefficient following the start position to be alternatively included in each of the plurality of divided DCT coefficients, thereby generating the plurality of divided DCT coefficients; and coding each of the plurality of divided DCT coefficients together with the video header and the motion vector, and wherein the start position is determined as follows:

Start position=$a \log_{10}(PLR)+b$, where a is the number of pixels included in a macroblock for which the DCT coefficient is calculated, b=2a, 0<Start position<(a−1), and PLR is a packet loss rate in the transmission channel.

8. The video transcoding method of claim 7, wherein the Lagrange cost of the single description is the sum of reconstruction errors, the Lagrange cost of the multiple descriptions is a sum of the reconstruction errors and a multiplication result of the amount of redundancy and a predetermined or desired Lagrange multiplier, and the determining of whether to perform transcoding into the single description or the multiple descriptions includes determining to perform transcoding into the multiple descriptions if the Lagrange cost of the single description is larger than that of the multiple descriptions and determining to perform transcoding into the single description if the Lagrange cost of the multiple descriptions is larger than that of the single description.

9. The video transcoding method of claim 8, wherein the Lagrange cost is calculated as follows:

$J=D_{total}+\lambda \times \rho$, where J is the Lagrange cost, $D_{total}$ is a sum of reconstruction errors, $\lambda$ is a Lagrange multiplier, and $\rho$ is the amount of redundancy where $\rho$ is equal to 0 when the Lagrange cost of the single description is calculated and $\rho$ is obtained by subtracting the number of bits required for compressing the single description from the number of bits required for compressing all descriptions when the Lagrange cost of the multiple descriptions is calculated.

10. The video transcoding of claim 7, wherein a reconstruction error in each pixel of each frame of the compressed video in the transmission channel is calculated as follows:

$d_n^i = E\{(f_n^i - \tilde{f}_n^i)^2\} = (f_n^i)^2 - 2f_n^i E\{\hat{f}_n^i\} + E\{(\tilde{f}_n^i)^2\}$, where $d_n^i$ is a reconstruction error of an $i^{th}$ pixel in an $n^{th}$ frame, $f_n^i$ may be obtained using video header, a motion vector, and a DCT coefficient decoded into original values of the $i^{th}$ pixel in the $n^{th}$ frame, $\tilde{f}_n^i$ is a reconstruction predicted value of the $i^{th}$ pixel in the $n^{th}$ frame, and E is an averaging operation in which $E\{\hat{f}_n^i\}$ is a first-order averaging operation and $E\{(\hat{f}_n^i)^2\}$ indicates a second-order averaging operation, and wherein when the compressed video is transcoded into the single description in an intra format, the first-order averaging operation and the second-order averaging operation are calculated as follows:

$E\{\hat{f}_n^i\}(I)=(1-p)(\hat{f}_n^i)+p(1-p)E\{\tilde{f}_{n-1}^k\}+p^2E\{\tilde{f}_{n-1}^i\}$ $E\{(\tilde{f}_n^i)^2\}(I)=(1-p)(\hat{f}_n^i)^2+p(1-p)E\{(\tilde{f}_{n-1}^k)^2\}+p^2E\{(\tilde{f}_{n-1}^i)^2\}$, when the compressed video is transcoded into the multiple descriptions in an intra format, the first-order averaging operation and the second-order averaging operation are calculated as follows:

$E\{\hat{f}_n^i\}(I)=(1-p)^2(\hat{f}_n^i)+p(1-p)((\tilde{f}_n^i)_1+(\tilde{f}_n^i)_2)+p^2E\{\tilde{f}_{n-1}^i\}$ $E\{(\tilde{f}_n^i)^2\}(I)=(1-p)^2(\hat{f}_n^i)^2+p(1-p)((\hat{f}_n^i)_1^2+(\hat{f}_n^i)_2^2)+p^2E\{(\tilde{f}_{n-1}^i)_2\}$, when the compressed video is transcoded into the single description in the inter format, the first-order averaging operation and the second-order averaging operation are calculated as follows:

$E\{\hat{f}_n^i\}(P)=(1-p)(\hat{e}_n^i+E\{\tilde{f}_{n-1}^j\})+p(1-p)E\{\tilde{f}_{n-1}^k\}+p^2E\{\tilde{f}_{n-1}^i\}$ $E\{(\tilde{f}_n^i)^2\}(P)=(1-p)E(\hat{e}_n^i+\tilde{f}_{n-1}^j)^2+p(1-p)E\{(\tilde{f}_{n-1}^k)^2\}+p^2E\{(\tilde{f}_{n-1}^i)^2\}$, and when the compressed video is transcoded into the multiple descriptions in the inter format, the first-order averaging operation and the second-order averaging operation are calculated as follows:

$$E\{\tilde{f}_n^i\}(P) = (1-p)^2\left(\hat{e}_n^i + E\{\tilde{f}_{n-1}^j\}\right) +$$
$$p(1-p)\left((\hat{e}_n^i)_1 + E\{\tilde{f}_{n-1}^{j1}\} + (\hat{e}_n^i)_2 + E\{\tilde{f}_{n-1}^{j2}\}\right) + p^2 E\{\tilde{f}_{n-1}^i\}$$

$$E\left\{(\tilde{f}_n^i)^2\right\}(P) = (1-p)^2\left((\hat{e}_n^i)^2 + 2\hat{e}_n^i E\{\tilde{f}_{n-1}^j\} + E\{\tilde{f}_{n-1}^j\}^2\right) +$$
$$p(1-p)\left((\hat{e}_n^i)_1^2 + 2(\hat{e}_n^i)_1 E\{\tilde{f}_{n-1}^{j1}\} + E\left\{(\tilde{f}_{n-1}^{j1})^2\right\} + (\hat{e}_n^i)_2^2 +\right.$$
$$\left. 2(\hat{e}_n^i)_2 E\{\tilde{f}_{n-1}^{j2}\} + E\{(\tilde{f}_{n-1}^{j2})^2\}\right) + p^2 E\left\{(\tilde{f}_{n-1}^i)^2\right\}.$$

\* \* \* \* \*